United States Patent [19]

Nakamichi

[11] Patent Number: 5,682,369
[45] Date of Patent: *Oct. 28, 1997

[54] TWO-BELT DISK ROTATING AND TRANSPORT DRIVE

[75] Inventor: Niro Nakamichi, Tokyo, Japan

[73] Assignee: Nakamichi Corporation, Tokyo, Japan

[*] Notice: The term of this patent shall not extend beyond the expiration date of Pat. No. 5,561,658.

[21] Appl. No.: 517,756

[22] Filed: Aug. 22, 1995

[30] Foreign Application Priority Data

Aug. 26, 1994 [JP] Japan ............................ 6-225496
Jul. 10, 1995 [JP] Japan ............................ 7-196987
Jul. 10, 1995 [JP] Japan ............................ 7-196988

[51] Int. Cl.$^6$ .................................................. G11B 17/04
[52] U.S. Cl. .................................... 369/75.2; 369/270
[58] Field of Search .............................. 369/266, 270, 369/271, 264, 75.2, 77.1, 75.1

[56] References Cited

U.S. PATENT DOCUMENTS

| | | | |
|---|---|---|---|
| 2,661,217 | 12/1953 | Bidinger | 369/266 |
| 3,844,571 | 10/1974 | Mensier | 369/266 |
| 4,047,721 | 9/1977 | Hermann | 369/266 |
| 4,682,320 | 7/1987 | d'Arc | 369/77.1 |
| 5,463,613 | 10/1995 | Forsell | 369/266 |
| 5,561,658 | 10/1996 | Nakamichi et al. | 369/270 |

FOREIGN PATENT DOCUMENTS

| | | | |
|---|---|---|---|
| 154547 | 3/1951 | Australia | 369/266 |
| 0392489 | 10/1990 | European Pat. Off. | |
| 0464382 | 1/1992 | European Pat. Off. | |
| 0558302 | 9/1993 | European Pat. Off. | |
| 2538597 | 6/1984 | France | |
| 1198578 | 8/1965 | Germany | 369/266 |
| 2218040 | 10/1973 | Germany | 369/266 |
| 57-012453 | 1/1982 | Japan | |
| 60-106250 | 7/1985 | Japan | |
| 61-24851 | 2/1986 | Japan | |
| 62-47893 | 3/1987 | Japan | |
| 2227866 | 9/1990 | Japan | |
| 4013265 | 1/1992 | Japan | |
| 2232524 | 12/1990 | United Kingdom | |

*Primary Examiner*—Robert S. Tupper
*Assistant Examiner*—Brian E. Miller
*Attorney, Agent, or Firm*—Morrison Law Firm

[57] ABSTRACT

A disk playback device has a pair of endless drive belts. A disk is held between the two drive belts. The belts rotate in the same direction to move the disk to different positions within the disk playback device. The belts also rotate in opposite directions to rotate the disk when the disk is in the playback position, thereby eliminating the need for separate disk rotating means and disk transport means.

18 Claims, 16 Drawing Sheets

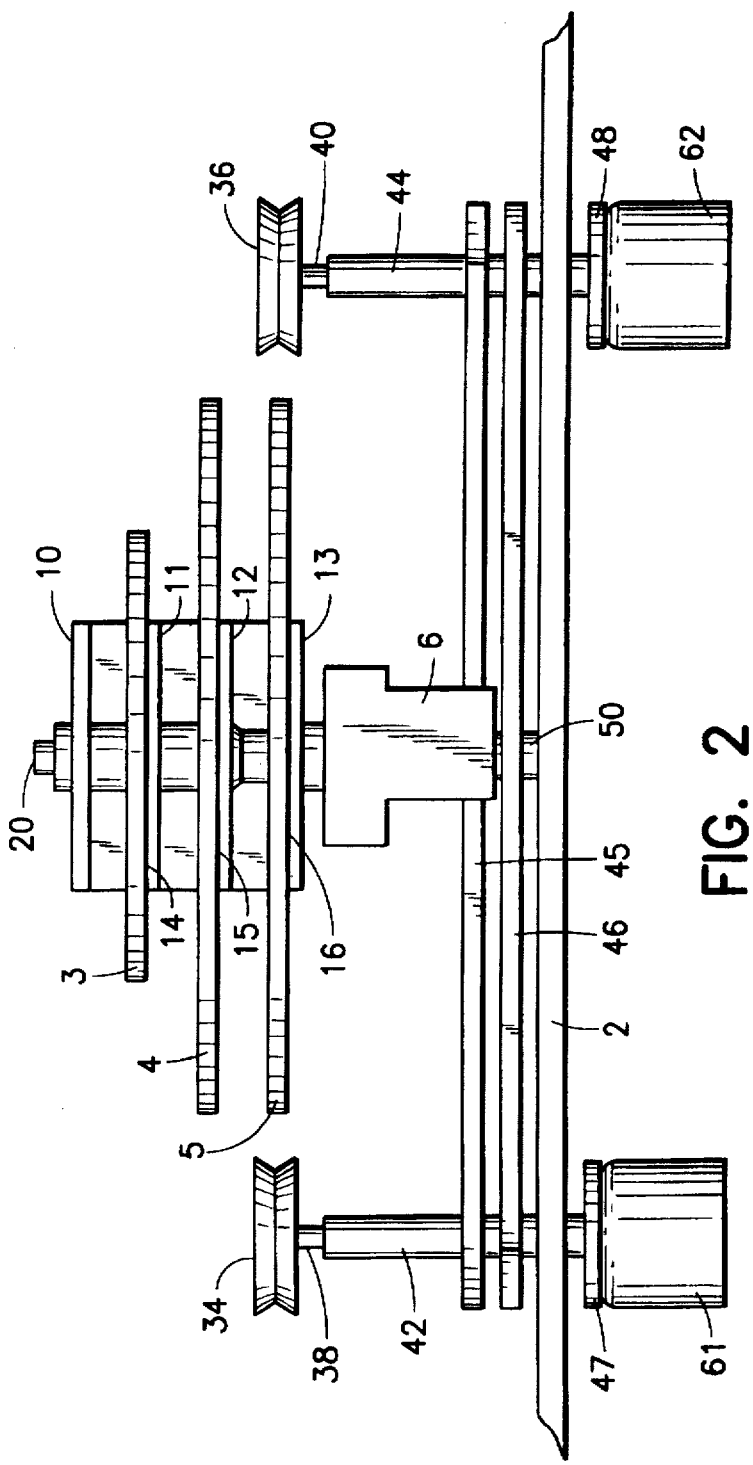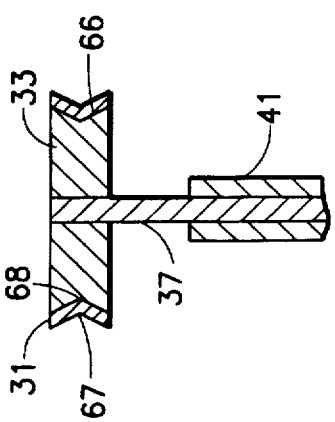
FIG. 2
FIG. 3

TWO-BELT DISK ROTATING AND TRANSPORT DRIVE

BACKGROUND OF THE INVENTION

The present invention relates to a disk playback and storage devices that use a pair of endless drive belts to transport and play back a recorded disk. Disk playback devices that use pairs of drive belts for transporting disks between an eject position and a playback position are known. For example, Japanese Laid-open Patent Publication No. 60-106250 and Japanese Laid-open Patent Publication No. 61-24851 show such mechanisms. Also known are devices that employ a single belt in a changer mechanism for transporting and storing multiple disks. For example, Japanese Laid-open Patent Publication No. 62-47893 shows such a device.

The drive belts in these prior art disk transport mechanisms move the disk in a direction parallel to the recorded surface of the disk. The disk is transported to a playback mechanism which rotates the disk for playback. The systems are generally complex and space-consuming.

OBJECTS AND SUMMARY OF THE INVENTION

It is an object of the present invention to provide a disk player with a disk transport mechanism that utilizes the same mechanism to transport and rotate a disk for playback.

It is an object of the invention to overcome the drawbacks of the prior art.

It is another object of the invention to provide a drive system for variable sized disks.

It is still another object of the present invention to provide a disk transporter that is compact and which uses a minimum of individual components.

It is still another object of the invention to provide a disk player mechanism that is compact and inexpensive to manufacture.

It is another object of the present invention to provide a disk player with a belt driven disk transport mechanism that transports the disk and rotates the disk.

Briefly stated, a disk playback device has a pair of endless drive belts. A disk is held between the pair of drive belts. The belts rotate in the same direction to move the disk to different positions within the disk playback device. The belts rotate in opposite directions to rotate the disk when the disk is in the playback position, thereby eliminating the need for separate disk rotating means and disk transport means.

According to an embodiment of the present invention, there is disclosed, a disk playback device for playing back a disk, comprising a chassis having first and second positions, a pair of endless drive belts, each having an inner surface and an outer surface, rotatably supported by said chassis, means for positioning said pair of endless drive bells to support said disk therebetween, a portion of said outer surface of each one of said pair of endless drive belts engaging a respective one of two opposing portions of a rim of said disk, means for rotating said endless drive belts, first controlling means for rotating said pair of endless drive belts in opposing directions, whereby said disk is rotated, second controlling means for rotating at least one of said pair of endless drive belts such that said disk is transported between said first and second positions, and means on said chassis for reading said disk while said disk is rotated.

According to another embodiment of the present invention, there is disclosed, a disk playback device capable of holding a plurality of disks, comprising a chassis, first and second endless drive belts, each having an inner surface and an outer surface, first and second drive pulleys, first and second driven pulleys, said first endless drive belt reeved around said first drive pulley and said first driven pulley, said first drive pulley and said first driven pulley being rotatably supported on said chassis, said second endless drive belt reeved around said second drive pulley and said second driven pulley, parallel to said first endless drive belt, said second drive pulley and said second driven pulley being rotatably supported on said chassis, spanning portions of said first and second endless drive belts are reeved between said respective drive pulleys and said respective driven pulleys, said spanning portions being on a common horizontal plane, a stocker for holding said plurality of disks, means for moving said stocker vertically such that a selected one of said plurality of disks is positioned on said horizontal plane of said first and second endless drive belts, means for simultaneously moving said first and second endless drive belts toward or away from said selected disk so that said selected disk is selectively held and released by said first and second endless drive belts, first means for rotating said first and second endless drive belts such that said disk is transferred between said stocker, a playback position and an eject position, second means for rotating said first and second endless drive belts such that said disk is rotated in said playback position, and means for playing back said disk while said disk is rotated in said playback position.

According to yet another embodiment of the present invention, there is disclosed, A disk playback device for playing back a disk comprising a chassis, a first belt rotatably supported on said chassis, means for supporting one portion of an edge of a disk and urging an opposite portion of said edge against said first belt, means for rotating said first belt, said means for supporting including selectable means for transporting said disk when said first belt is rotated and said means for supporting having selectable means for rotating said disk about a center thereof when said first belt is rotated.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a front-view of the disk playback device.

FIG. 3 is a cross-section view along the A—A line in FIG. 1.

DETAILED DESCRIPTION OF THE PREFERRED EMBODIMENTS

Figure 1:
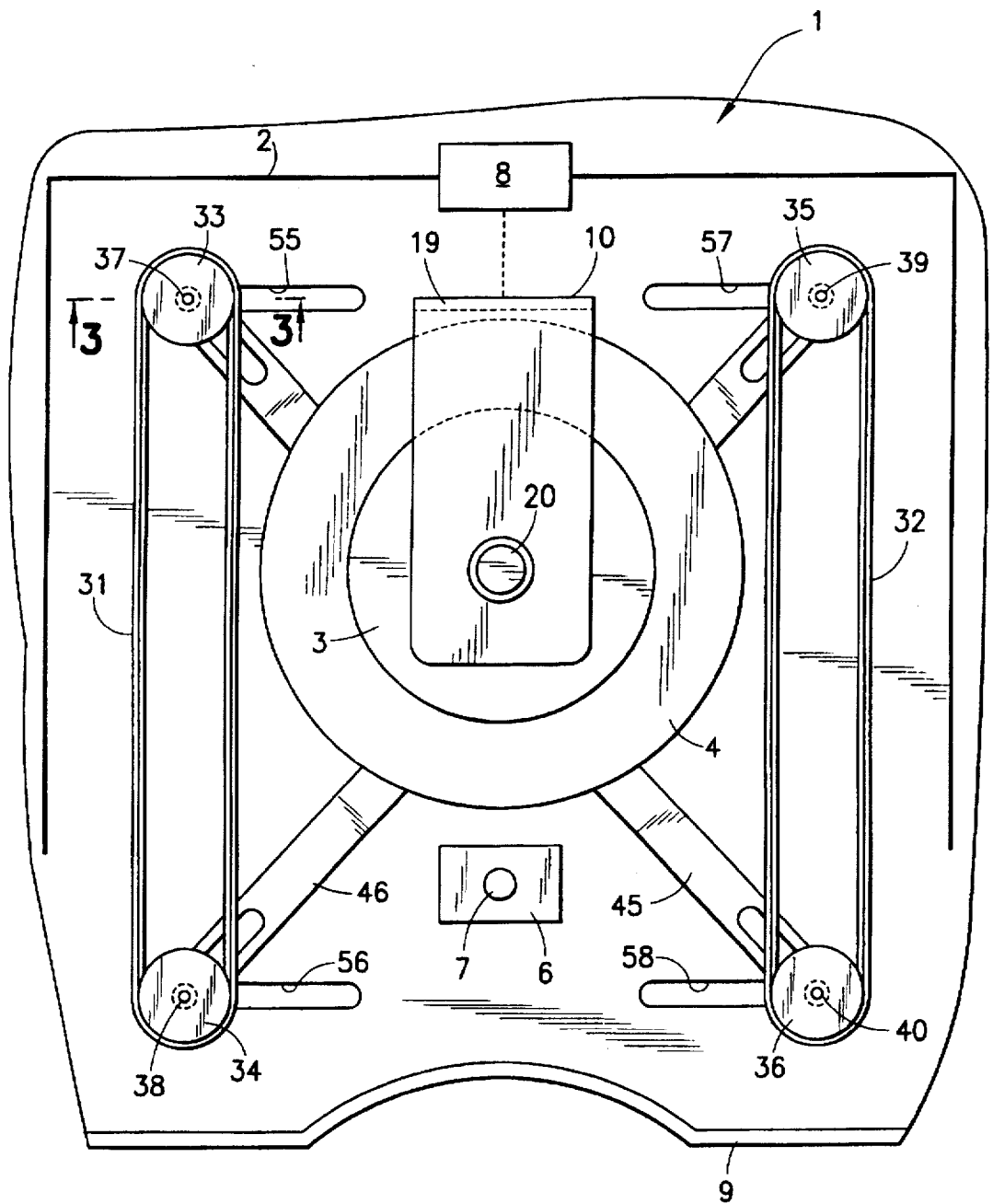
FIG. 1 is a plan of the disk playback device.

Referring to FIG. 1, a changer-type disk playback device 1 holds three disks. Disk playback device 1 has a chassis 2 and a front panel 9. Front panel 9 has a slit-shaped opening (not shown in the drawings) for receiving and ejecting one of the disks.

Referring also to FIG. 2, disk playback device 1 also includes a stocker 10 in which an 8 cm. disk 3, having an outer diameter of 8 cm., and first and second 12 cm. disks 4 and 5, having outer diameters of 12 cm., are stored. Eight cm. disk 3 and first and second 12 cm. disks 4 and 5 are concentrically aligned within stocker 10. A stocker transferring mechanism 8 is positioned to move stocker 10 vertically (ie, perpendicular to the plane of FIG. 1) relative to chassis 2. Additionally, mounting plates 11, 12, and 13, on which 8 cm. disk 3 and first and second 12 cm. disks 4 and 5 are mounted, attach to a vertical wall 19 at the rear end of stocker 10. Upper surfaces 14, 15, and 16 of mounting plates 11, 12, and 13 support 8 cm. disk 3 and first and second 12 cm. disks 4 and 5, respectively.

An endless drive belt 31 is supported by a drive pulley 33 and a driven pulley 34. Another endless drive belt 32 is supported by a drive pulley 35 and a driven pulley 36. Endless drive belts 31 and 32 are held taut by respective pulleys creating straight spanning portions of drive belts 31 and 32 between them. Endless drive belts 31 and 32 are parallel. Drive pulleys 33 and 35 and driven pulleys 34 and 36 are slidably supported such that endless drive belts 31 and 32 move toward and away from each other while remaining parallel.

Figure 9:
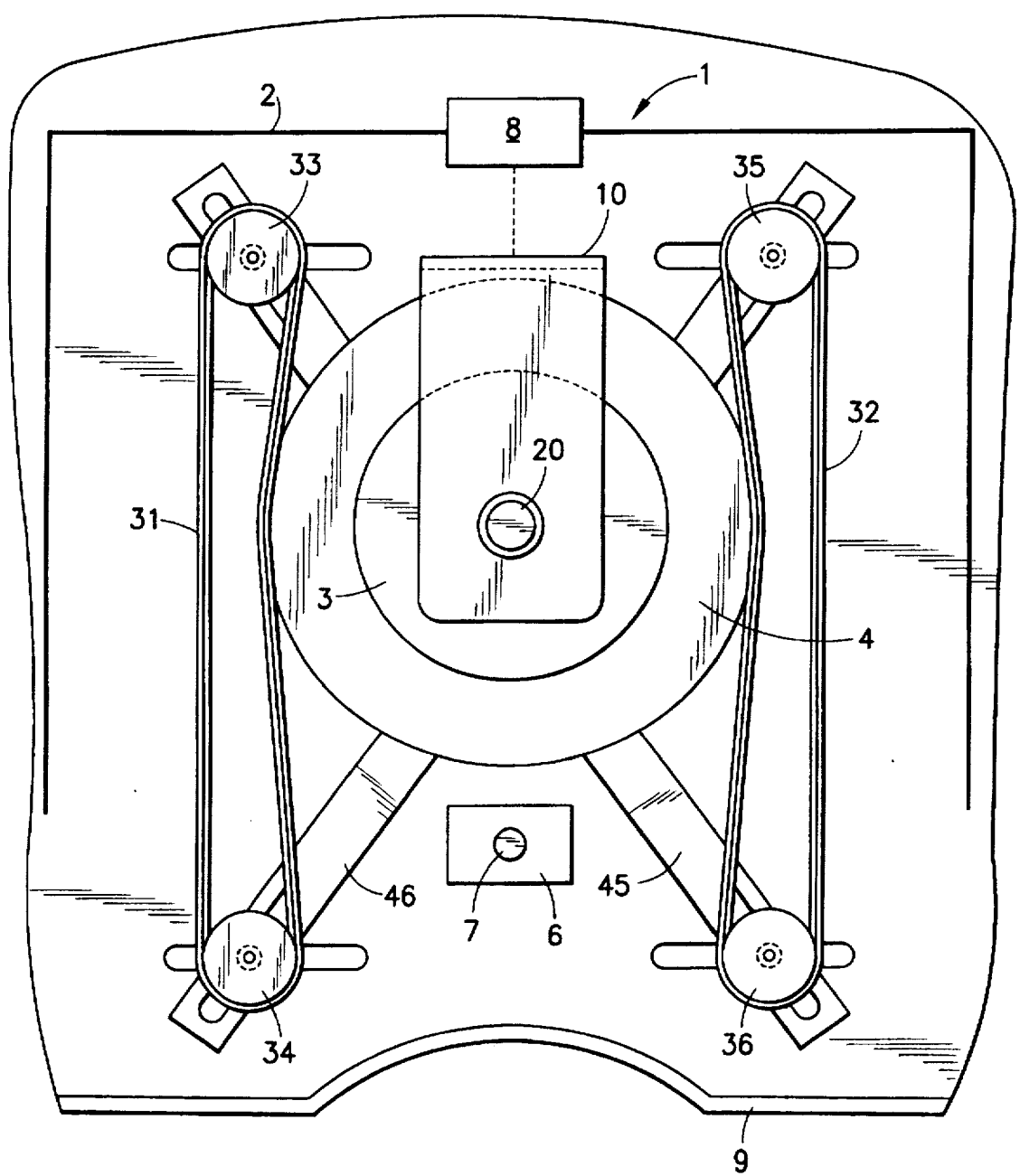
FIG. 9 is a plan view of the disk playback device showing the pair of drive belts holding a disk.

Referring to FIG. 9, endless drive belts 31 and 32 support a selected disk, such as first 12 cm. disk 4, by embracing a rim thereof. Endless drive belts 31 and 32 move toward first 12 cm. disk 4 until each of endless drive belts 31 and 32 contact the rim of first 12 cm. disk 4. Once endless drive belts 31 and 32 make contact with the rim, pulley pairs 33–34 and 35–36, are driven slightly further causing endless drive belts 31 and 32 to bow. In this position, the distances between drive pulleys 33 and 35 is less than the diameter of first 12 cm. disk 4. Since endless drive belts 31 and 32 are of a resilient material, endless belts 31 and 32 are urged toward each other against the rim of first 12 cm. disk 4, to support first 12 cm. disk. Endless drive belts 31 and 32 transport first 12 cm. disk 4 within disk playback device 1 by moving in the same direction while supporting first 12 cm. disk 4 between them. When first 12 cm. disk 4 is in the playback position, endless drive belts 31 and 32 move in opposite directions while supporting first 12 cm. disk 4, causing first 12 cm. disk 4 to rotate.

Referring to FIG. 3, drive pulley 33 has a V-shaped groove 66 along its rim. Endless drive belt 31 is reeved around V-shaped groove 66. Endless drive belt 31 has a V-shaped cross-section so that it presents a concave V-shaped groove 67 on its outer perimeter and a convex V-shaped surface 68 on its inner perimeter. Convex V-shaped surface 68 engages with V-shaped groove 66 of drive pulley 33. Drive pulley 35 and driven pulleys 34 and 36 have the same shape as drive pulley 33. Endless drive belt 32 has the same shape as endless drive belt 31.

Figure 4:
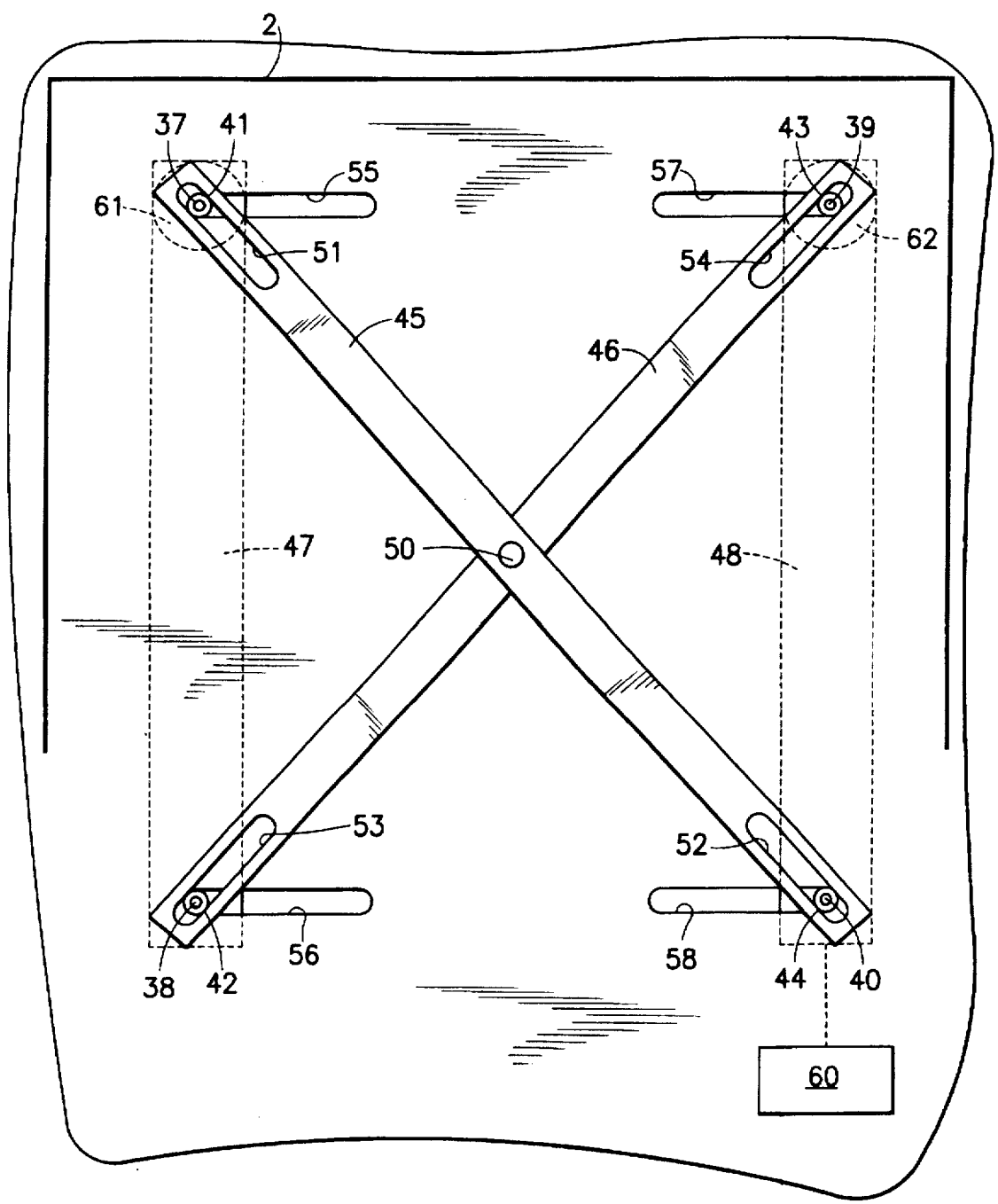
FIG. 4 is a plan view of the disk playback device shown in FIG. 1 where stocker 10, drive belts 31 and 32, drive pulleys 33 and 35, and driven pulleys 34 and 36 are omitted.

Referring now also to FIG. 4, spanning portions of drive belts 31 and 32 are kept parallel by a translation mechanism 1001. Drive pulley shafts 37 and 39 and driven pulley shafts 38 and 40 support drive pulleys 33 and 35 and driven pulleys 34 and 36, respectively. Drive pulley shafts 37 and 39 and driven pulley shafts 38 and 40 are supported by bearings 41, 43, 42 and 44, respectively. Bearings 41 and 42 are affixed on opposing ends of a longitudinal sliding plate 47 on a left side of chassis 2. Bearings 43 and 44 are fixed on opposing ends of a longitudinal sliding plate 48 on a right side of chassis 2.

Chassis 2 has slots 55–58 running perpendicular to longitudinal axes of sliding plates 47 and 48. Bearings 41–44 are upwardly insert through slots 55–58, respectively.

A pair of longitudinal rotating arms 45 and 46 are rotatably supported at their centers on a shaft 50 attached to chassis 2. Longitudinal slots 51 and 52 pierce opposing ends of longitudinal rotating arm 45. Slots 51 and 52 are equidistant from a center of rotating arm 45 with their longitudinal axes parallel to the axis of rotating arm 45. Bearings 41 and 44 insert into slots 51 and 52, respectively. Similarly, longitudinal slots 53 and 54 pierce opposing ends of longitudinal rotating arm 46. Slots 53 and 54 are equidistant from a center of rotating arm 46 with their longitudinal axes parallel to the axis of rotating arm 46. Bearings 42 and 43 insert into slots 53 and 54, respectively.

Sliding plates 47 and 48 move parallel to each other. The line connecting the axes of drive pulley shaft 37 and driven pulley shaft 38 is always parallel to the line connecting the axes of drive pulley shaft 39 and driven pulley shaft 40. Thus, drive belts 31 and 32 remain parallel as drive pulleys 33 and 35 and driven pulleys 34 and 36 are moved.

A drive belt transfer mechanism 60 is connected to sliding plate 48. Drive belt transfer mechanism 60 moves sliding plate 48. Sliding plate 47, connected by rotating arms 45 and 46 to sliding plate 48, moves the same amount as sliding plate 48. Thus, drive belts 31 and 32 are moved equal distances closer or further away from each other. Motors 61 and 62 are attached to sliding plates 47 and 48 respectively. The shafts of motors 61 and 62 pass through bearings 41 and 43 and connect to shafts 37 and 39 of drive pulleys 33 and 35, respectively (drive pulleys 33 and 35 are not shown in FIG. 4). Motors 61 and 62 power drive pulleys 33 and 35, respectively, to transport and rotate the disk.

Referring to FIG. 1, an optical pickup 6 having an object lens 7 is affixed to chassis 2 for optical playback of data recorded on 8 and first and second 12 cm. disks 3, 4, and 5. Data is recorded in the form of spiral tracks. The tracks are followed using a well-known tracking servo-mechanism to follow the light reflected from the track and received by optical pickup 6. As the spiral track is followed, optical pickup 6 moves relative to the disk being played back, from the disk's inner perimeter to its outer perimeter.

Optical pickup 6 is affixed to chassis 2. Disk 4 moves in a radial direction, during playback, relative to optical pickup 6. Since optical pickup 6 is fixed, no transfer mechanism for moving optical pickup 6 is required. Therefore, mechanical vibration caused by such a transfer mechanism is not transmitted to optical pickup 6, providing very stable relative positioning between optical pickup 6 and disk 4. Since drive belts 31 and 32 also rotate disk 4 for playback, the same drive system is used for both disk transport and playback, making the device cheaper to make.

Figure 5:
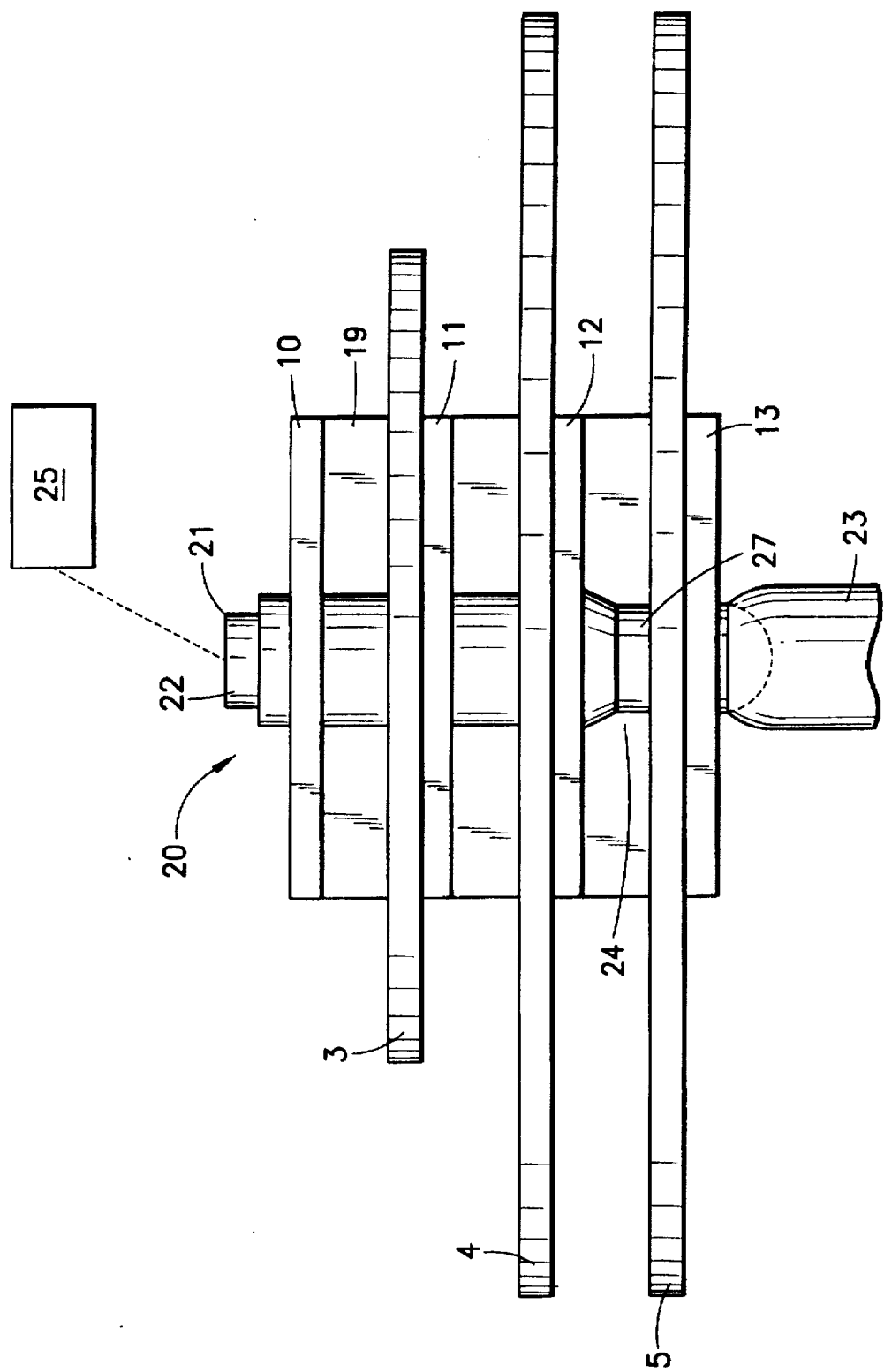
FIG. 5 is a schematic front-view showing a disk position restricting means.
Figure 6:
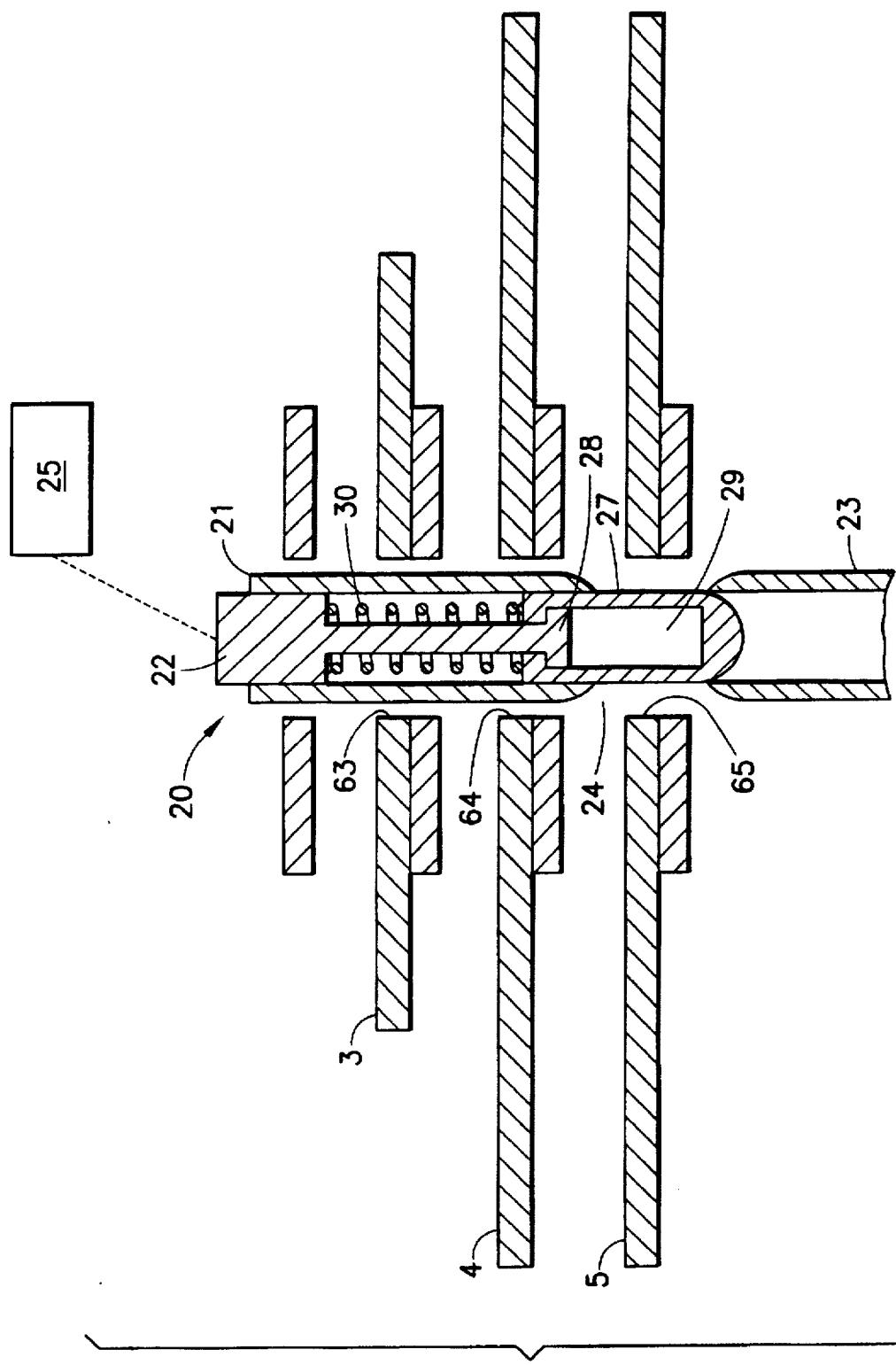
FIG. 6 is a cross-section view of the disk position restricting means of FIG. 5.

Referring to FIGS. 5 and 6, a disk position restricting means 20 restricts the positions of 8 cm. disk 3 and first and second 12 cm. disks 4 and 5 within stocker 10. Disk position restricting means 20 includes a hollow upper shaft 21 affixed to chassis 2. A transfer shaft 22 is moved inside upper shaft 21 by a shaft transfer mechanism 25. A hollow lower shaft 23 is affixed to chassis 2. Hollow lower shaft 23 shares an axis with upper shaft 21. Disks pass through a gap 24 between upper shaft 21 and lower shaft 23 during movement of disks to and from stocker 10.

Disk position restricting means 20 also includes a regulating shaft 27, which is urged away from transfer shaft 22 by a spring 30. A large-diameter section 28 on the tip of transfer shaft 22 inserts into an inner space 29 of regulating shaft 27. Regulating shaft 27, transfer shaft 22, and spring 30 can move within upper shaft 21. When in the position shown in FIG. 6, transfer shaft 22 is moved by shaft transfer mechanism 25 to a lowered position. This causes the tip of regulating shaft 27 to be inserted into the hollow portion of lower shaft 23 bridging gap 24.

Upper shaft 21 and lower shaft 23 pass through center holes 63, 64, and 65 of 8 cm. disk 3 and 12 cm. disks 4 and 5 in stocker 10. Center holes 63, 64, and 65 have the same inner diameters. Therefore, upper shaft 21 or lower shaft 23 pass through center holes 63, 64, and 65 of 8 cm. disk 3 and first and second 12 cm. disks 4 and 5 to locate and secure the disks precisely within stocker 10. Regulating shaft 27 bridges gap 24. Thus, upper shaft 21 restricts the motion of disks 3 and 4 and regulating shaft 27 restricts the motion of second 12 cm. disk 5.

Figure 8:
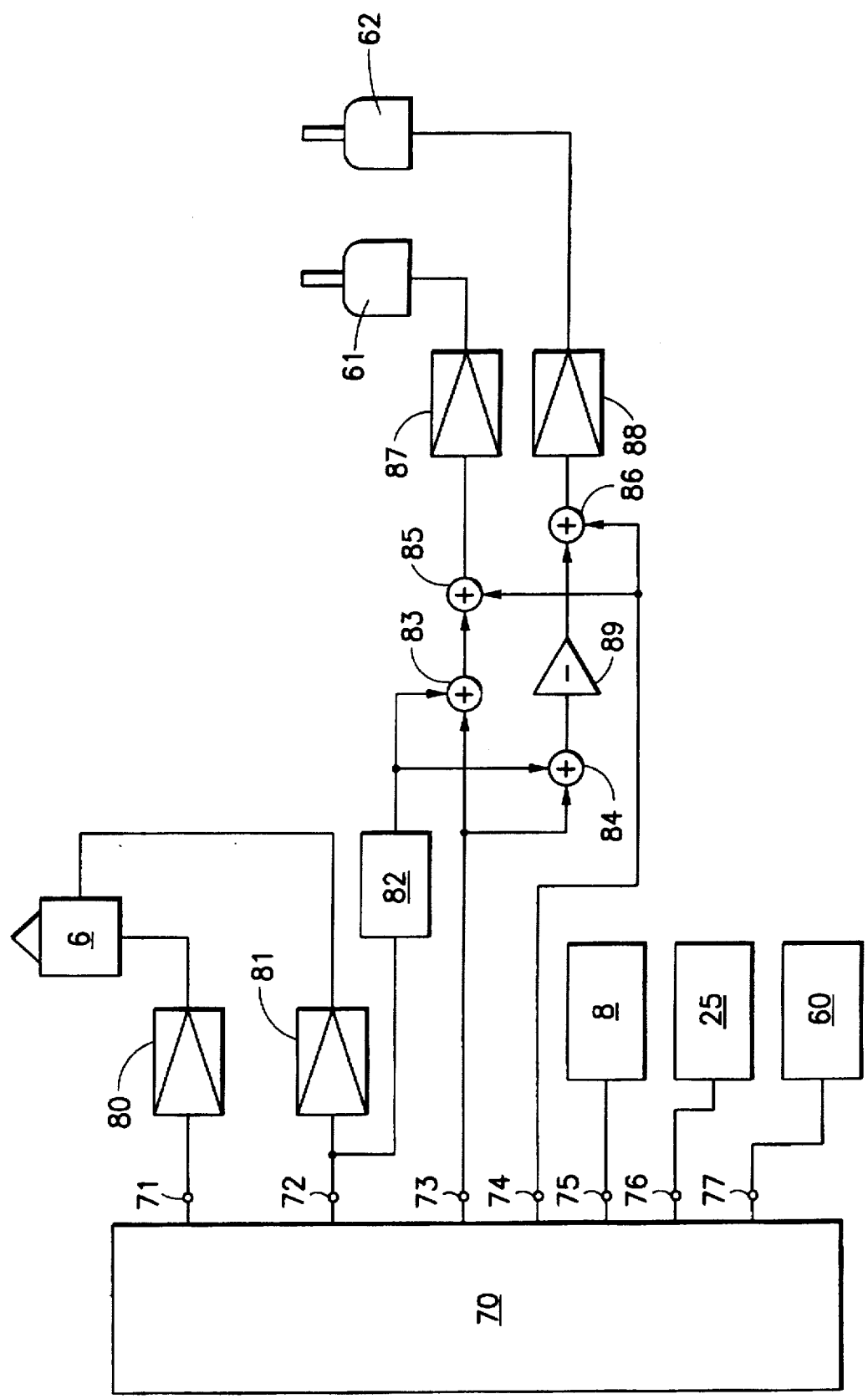
FIG. 8 is a block diagram of the circuit controlling the motors which drive the drive belts.

Referring to FIG. 8, a control circuit for disk playback device 1 includes a microprocessor 70. Microprocessor 70 outputs a focus servo-mechanism signal from output terminal 71 to move optical lens 7 of optical pickup 6 toward and away from the recorded surface of disks 3, 4, and 5 to bring the data tracks into focus. Microprocessor 70 also outputs a tracking servo-mechanism signal at output terminal 72. The tracking servo-mechanism signal is used to move optical lens 7 radially to maintain tracking of the spiral data tracks.

The servo-mechanism signals from output terminals 71 and 72 move object lens 7 in predetermined directions via drive circuits 80 and 81 respectively. A low-pass filter (hereinafter referred to as LPF), connected to terminal 72, extracts a DC component of the tracking servo-mechanism signal. The DC element is applied to adder circuits 83 and 84.

Output terminal 73 applies a disk transfer signal, to transport disks within device 1. When a disk is to be moved from the eject position toward stocker 10, a positive voltage, of a predetermined level, is output. When the disk is to be transported from stocker 10 toward the eject position, a negative voltage, of the same level, is output. The disk transfer signals are applied to first and second adder circuits 83 and 84 respectively. The output from first adder circuit 83 is applied to a third adder circuit 85. An output of second adder circuit 84 is applied to a fourth adder circuit 86 whose output is, in turn, applied to invertor 89.

Output terminal 74 of microprocessor 70 outputs a constant linear velocity (CLV) servo-mechanism signal, to regulate the speed of rotation of the disk. As is well known in the art, the CLV servo-mechanism signal maintains the disk's speed at a predetermined level using a phase difference between a synchronization signal, included in the playback signal from optical pickup 6, and a reverence clock as the error signal of a servo-controller. This CLV servo-mechanism signal is applied to third and fourth adder circuits 85 and 86. Output voltages of third and fourth adder circuits 85 and 86 are applied to drive circuits 87 and 88, respectively, to rotate motors 61 and 62.

During transport of a disk within device 1, the voltage indicating the desired direction is output at output terminal 73 to control motors 61 and 62. In response, motors 61 and 62 rotate endless drive belts 31 and 32, respectively, to transport the disk. During disk playback, motors 61 and 62 are controlled by the DC components of both the CLV servo-mechanism signal from output terminal 74, which controls the rotational velocity of the disk, and the tracking servo-mechanism signal from output terminal 72, which translates the disk relative to optical pickup 6 to track the spiral data track.

Output terminal 75 of microprocessor 70 is applied to stocker transfer mechanism 8 to control stocker transfer mechanism 8. Output terminal 76 is applied to shaft transfer mechanism 25 to control shaft transfer mechanism 25. Output terminal 77 is applied to drive belt transfer mechanism 60 to control drive belt transfer mechanism 60.

Referring to FIGS. 1 and 4, second 12 cm. disk 5, is stored in the lowermost position of stocker 10. Microprocessor 70 applies a control signal through output terminal 77 to drive belt transfer mechanism 60. Drive belt transfer mechanism 60 moves sliding plate 48 to the left along slots 57 and 58 in chassis 2. Simultaneously and consequently, sliding plate 47, connected to sliding plate 48 by rotating arms 45 and 46, moves toward the right along slots 55 and 56. Therefore, sliding plates 47 and 48 move toward each other while remaining parallel. Since drive belts 31 and 32 are carried on sliding plates 47 and 48, respectively, drive belts 31 and 32 are also move toward each other.

Referring to FIG. 9, endless drive belts 31 and 32 support the outer rim of second 12 cm. disk 5. Sliding plates 47 and 48 are moved to positions such that the separation distance between drive pulleys 33 and 35 and driven pulleys 34 and 36, respectively, is less than the outer diameter of second 12 cm. disk 5. Thus, endless drive belts 31 and 32 bow and wrap partially around a portion of the outer rim of 12 cm. disk 5.

Figure 7:
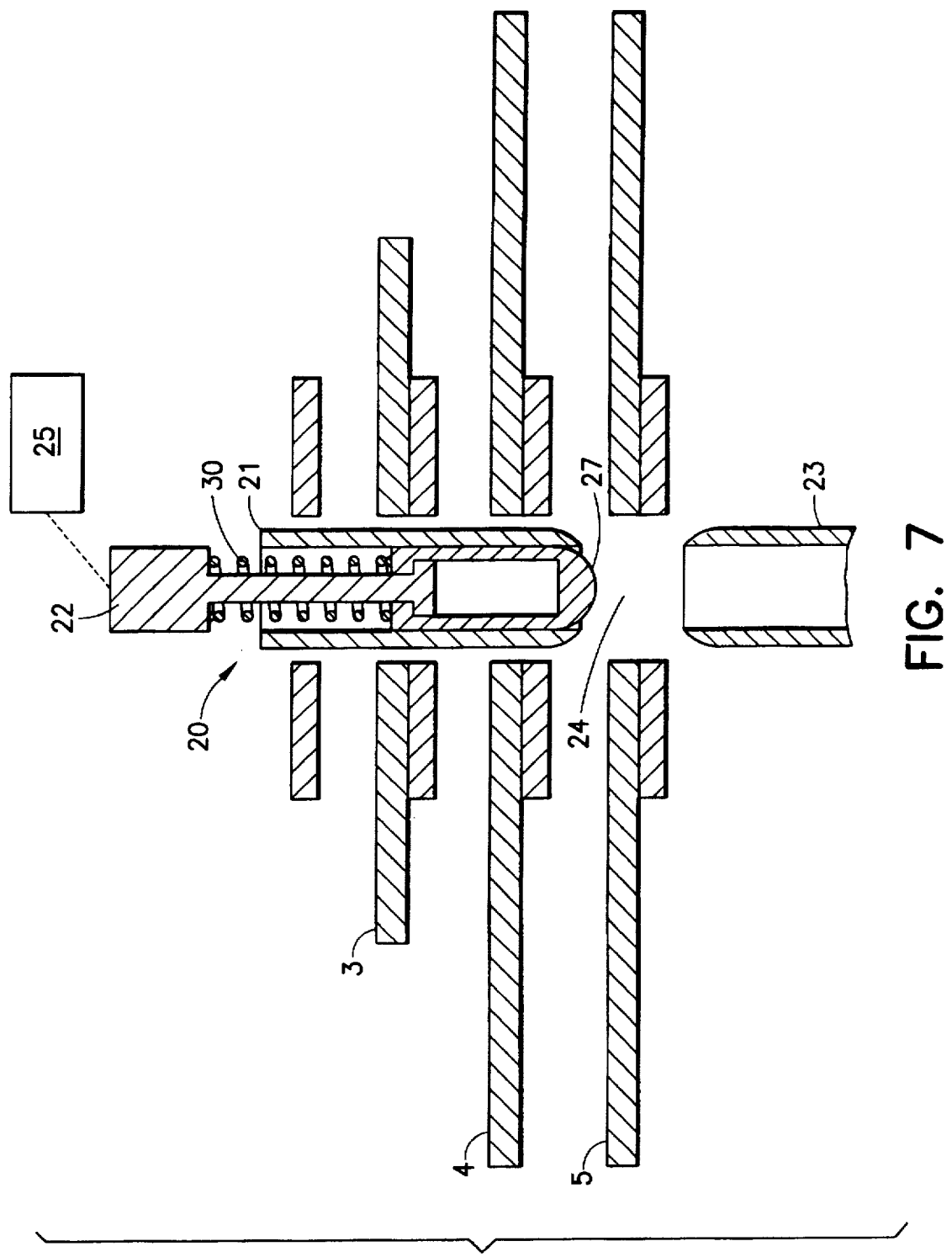
FIG. 7 is a cross-section view showing disk position restricting means when a gap is opened.

Referring to FIGS. 7 and 8, microprocessor 70 sends a control signal from output terminal 76 to control shaft transfer mechanism 25 before transferring second 12 cm disk 5 to the playback position. Shaft transfer mechanism 25 moves transfer shaft 22 upward to pull regulating shaft 27 into upper shaft 21. As a result, gap 24 between upper shaft 21 and lower shaft 23 is cleared for disk passage.

Microprocessor 70 sends a disk transfer signal having a predetermined negative voltage through output terminal 73. This causes motor 61 to rotate clockwise and motor 62 to rotate counterclockwise. This causes spanning portions of endless drive belts 31 and 32, that engage second 12 cm.

disk 5, to move in the same direction pulling second 12 cm. disk 5 out of stocker 10 toward the playback position.

Figure 10:
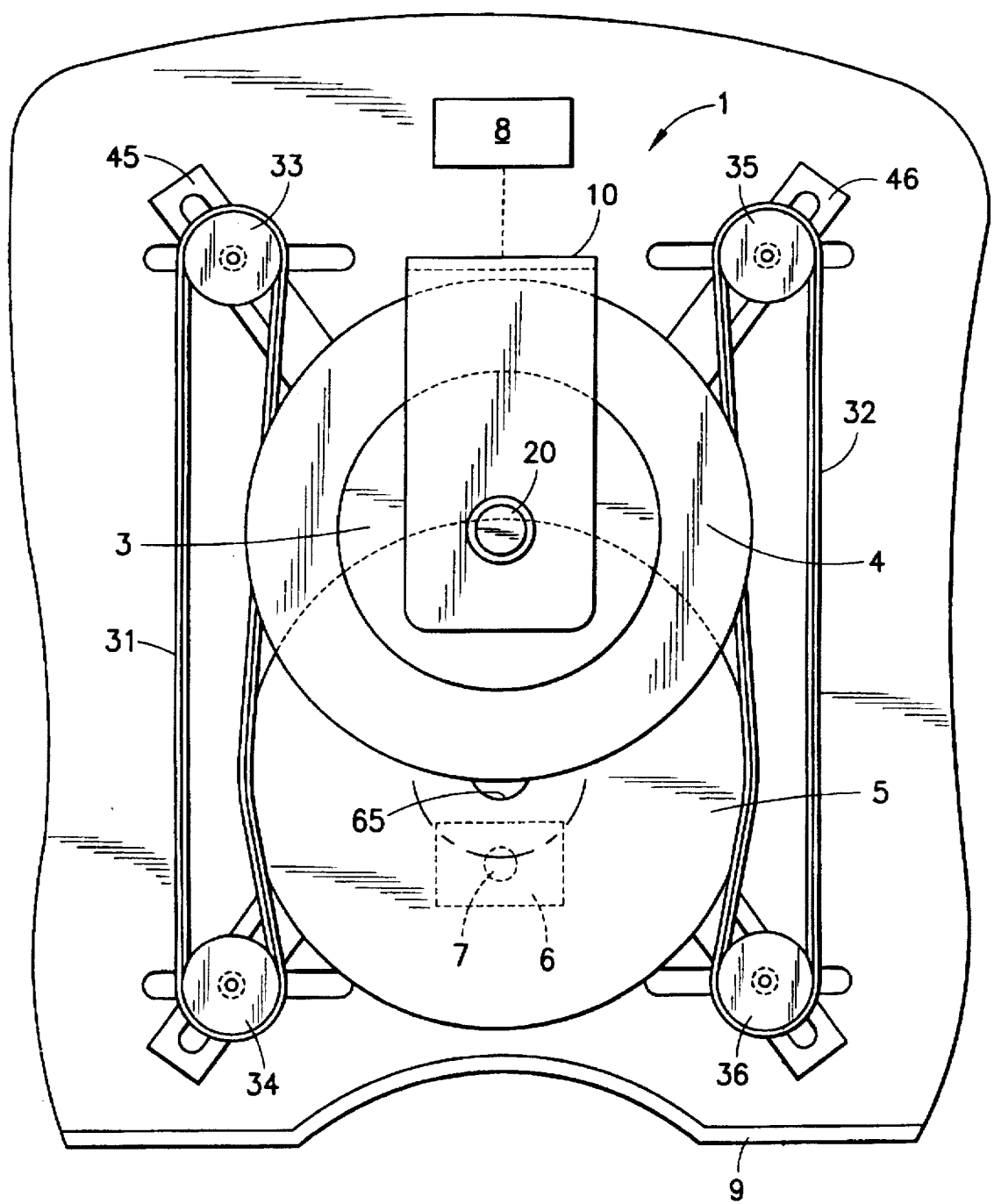
FIG. 10 is a plan view of the disk playback device showing a disk in an initial playback position.

Referring to FIG. 10, second 12 cm. disk 5 is brought to the initial playback position. At this position, object lens 7 of optical pickup 6 is at the innermost position of the recorded area, indicated by the dotted line on optical lens 7. When second 12 cm. disk 5 is brought to the indicated position, microprocessor 70 sends a positive CLV servo-mechanism signal from output terminal 74 to rotate motors 61 and 62 counterclockwise. This rotates the spanning portions of drive belts 31 and 32 engaging second 12 cm. disk 5 in opposite directions, causing second 12 cm. disk 5 to rotate clockwise at an appropriate speed.

A laser beam emitted from object lens 7 is focused on the recorded surface of second 12 cm. disk 5 and is moved to track the data track on second 12 cm. disk 5. Thus, the focus servo-mechanism moves object lens 7 axially with respect to the disk in response to movement of the disk surface of second 12 cm. disk 5. The tracking servo-mechanism moves object lens 7 radially with respect to second 12 cm. disk 5, in response to minor eccentric movements of second 12 cm. disk 5 or track nonuniformities.

The track on second 12 cm. disk 5 forms a spiral shape. Thus, as playback proceeds, object lens 7 gradually moves outward with respect to second 12 cm. disk 5. The velocities of drive belts 31 and 32 are simply the linear velocity of the recorded surface v, multiplied by the ratio of the radius of the disk $r_d$ to the radius of the current track $r_t$ at time t after beginning the reading of the innermost track. The values of $r_t$, t, and v are related to the track pitch of the recorded surface p and the radius of the innermost track $r_i$ as:

$$vpt = \pi(r_t^2 - r_i^2)$$

and therefore $r_t$ is:

$$r_t = \sqrt{r_i^2 + vpt/\pi}$$

Thus, the velocity of the belt changes substantially with the radius of the track being read.

Since object lens 7 must gradually move outwardly to maintain alignment with the track, a DC component appears in the tracking servo-mechanism signal. Referring to FIG. 8, the DC component is extracted by LPF 82 and applied to motor 61, through first and third adder circuits 83 and 85, and drive circuit 87. The DC component is also applied to motor 62, through second adder circuit 84, invertor 89, fourth adder circuit 86 and drive circuit 88. Thus the voltages sent to motor 61 and 62 are identical when the disk is rotated solely by the CLV servo-mechanism signal.

To change the position of the disk being read, the voltages applied to motors 61 and 62 are changed to lower the speed of motor 62 relative to motor 61. In response to the change in speed of motors 61 and 62, the speed of drive belt 31 increases relative to the speed of drive belt 32. This causes the center of rotation of second 12 cm. disk 5 to move away from object lens 7 and toward stocker 10 while object lens 7 of optical pickup 6 follows the spiral track recorded on second 12 cm. disk 5.

Referring to FIG. 3, drive belts 31 and 32 have a V-shaped cross-section. The rim of second 12 cm. disk 5 engages V-shaped groove 67 of drive belts 31 and 32. During playback, drive belts 31 and 32 are also partially wrapped around the rim of second 12 cm. disk 5. This inhibits vibrations on second 12 cm. disk 5 generated during rotation.

Figure 11:
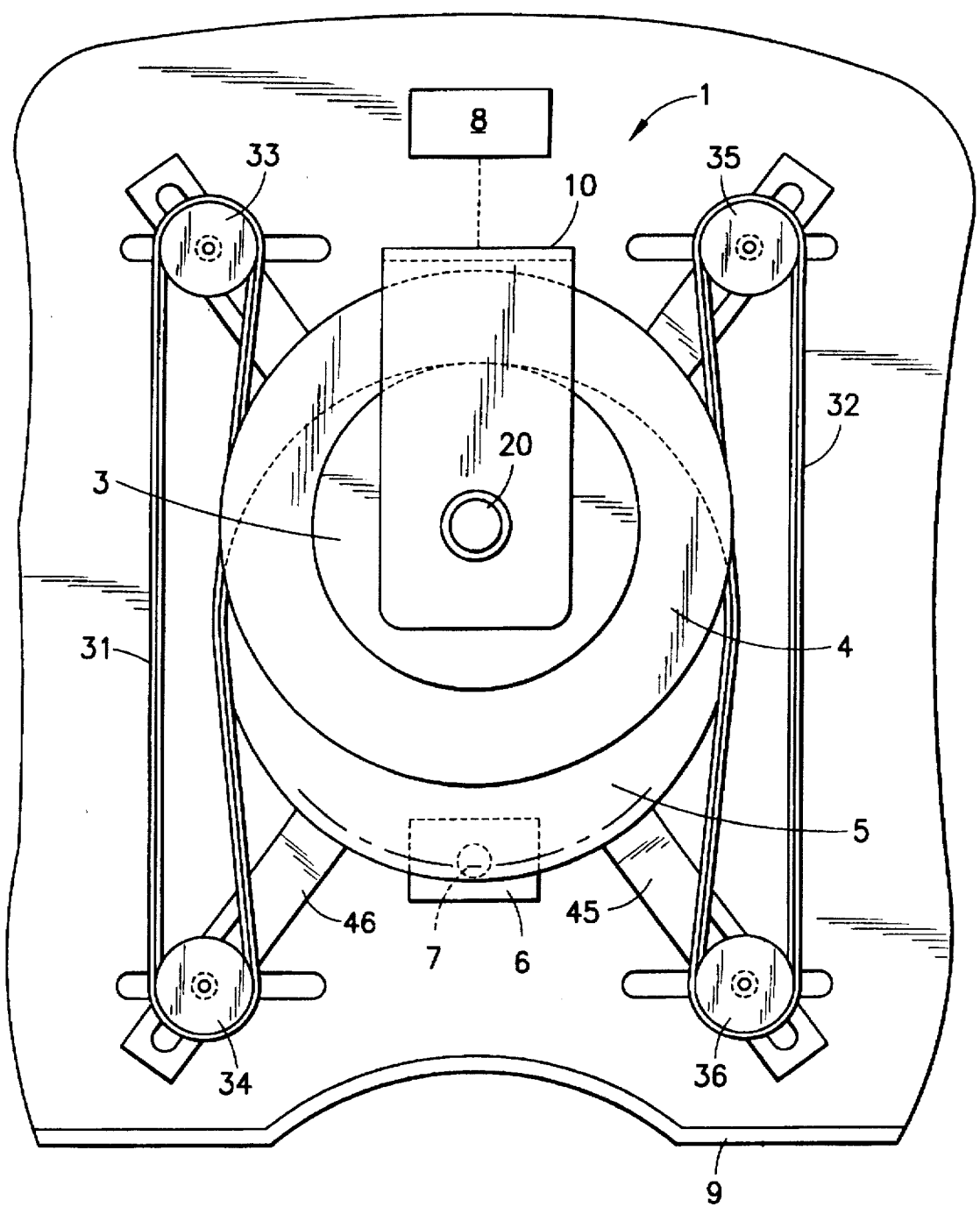
FIG. 11 is a plan view of the disk playback device a disk in a final playback position.

Referring to FIG. 11, drive belts 31 and 32 move second 12 cm. disk 5 relative to object lens 7 and optical pickup 6. When optical pickup 6 reads the outermost position of the recorded area, indicated by a double dotted line, playback of second 12 cm. disk 5 stops and a procedure to store second 12 cm. disk 5 is initiated.

Figure 12A:
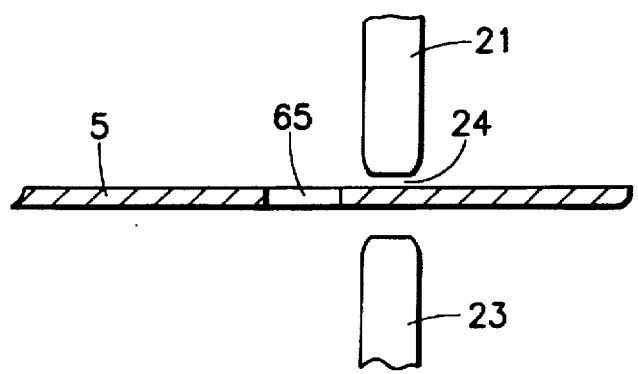
FIG. 12(a) is a view showing a disk in the disk playback device before being moved into the stocker.
Figure 12B:
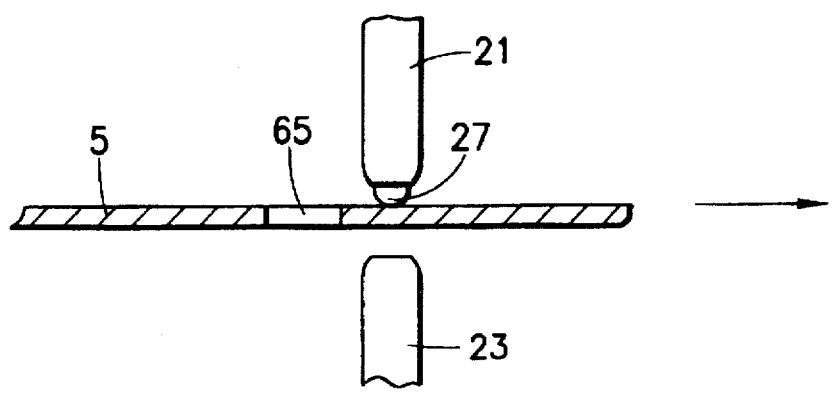
FIG. 12(b) is a view showing a disk and disk position restricting means as the disk is being transported into the stocker.
Figure 12C:
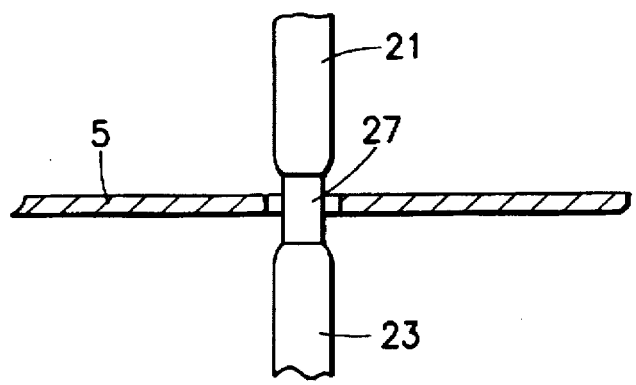
FIG. 12(c) is a view showing a disk and disk position restricting means after it has been transported into the stocker
Figure 13:
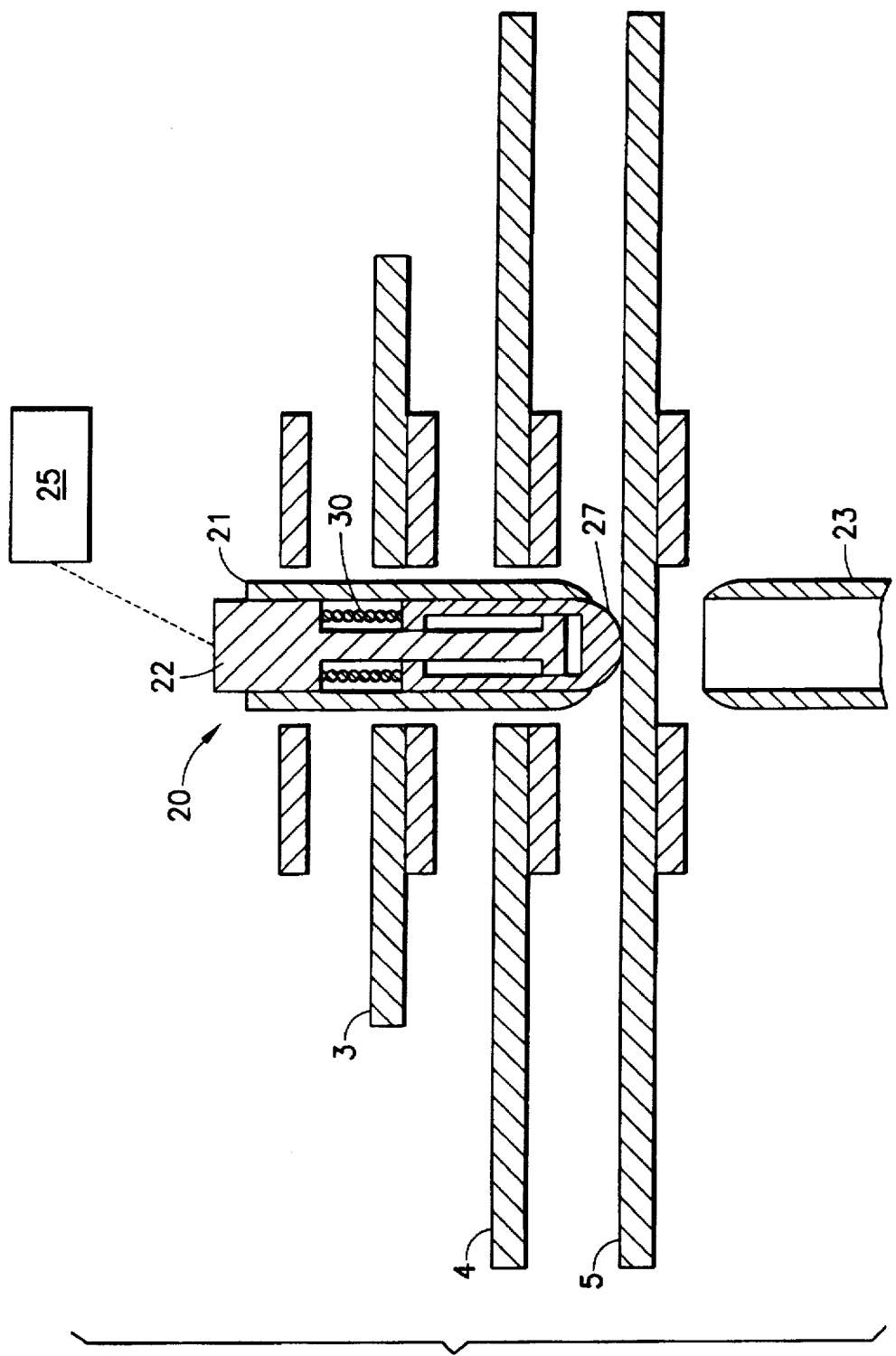
FIG. 13 is a schematic cross-section of the disk position restricting means with the regulating shaft is pressed against the disk.

Referring to FIGS. 11, 12(a), 12(b), and 12(c), to store second 12 cm. disk 5, initially at the final playback position, into stocker 10, regulating shaft 27 is moved into upper shaft 21. Thus gap 24 between upper shaft 21 and lower shaft 23, is cleared as shown in FIG. 12(a). In the final playback position, second 12 cm. disk 5 is positioned in gap 24. After playback is complete for second 12 cm. disk 5, microprocessor 70 outputs a control signal at output terminal 76. This causes transfer shaft 22 to move to the lowered position, to insert regulating shaft 27 in lower shaft 23. Since second 12 cm. disk 5 is within gap 24, the tip of the regulating shaft 27 contacts the surface of second 12 cm. disk 5 as shown in FIG. 12(b) and is held against the surface of second 12 cm. disk 5 by the urging of spring 30.

Referring now also to FIGS. 6 and 8, microprocessor 70 outputs a positive disk transfer signal from output terminal 73 causing endless drive belts 31 and 32 to begin moving second 12 cm. disk 5 toward the stocker (in the direction indicated by the arrow in FIG. 12(b)). With this movement, the tip of regulating shaft 27 slides along the surface of second 12 cm. disk 5. Once center hole 65 aligns with regulating shaft 27, regulating shaft 27 falls through center hole 65 of second 12 cm. disk 5 and inserts into lower shaft 23. A sensor 23a detects the insertion of regulating shaft 27 into lower shaft 23. When this insertion is detected, motors 61 and 62 and motion of second 12 cm. disk 5 are stopped.

The insertion of regulating shaft 27 through center hole 65 of second 12 cm. disk 5 secures it in position within stocker 10 and prevents it from coming out of stocker 10 due to vibrations or any other irregular movement of disk playback device 1. Eight cm. disk 3 and first 12 cm. disk 4, are positioned similarly within stocker 10 by upper shaft 21 and are also prevented from falling out of stocker 10.

Figure 14:
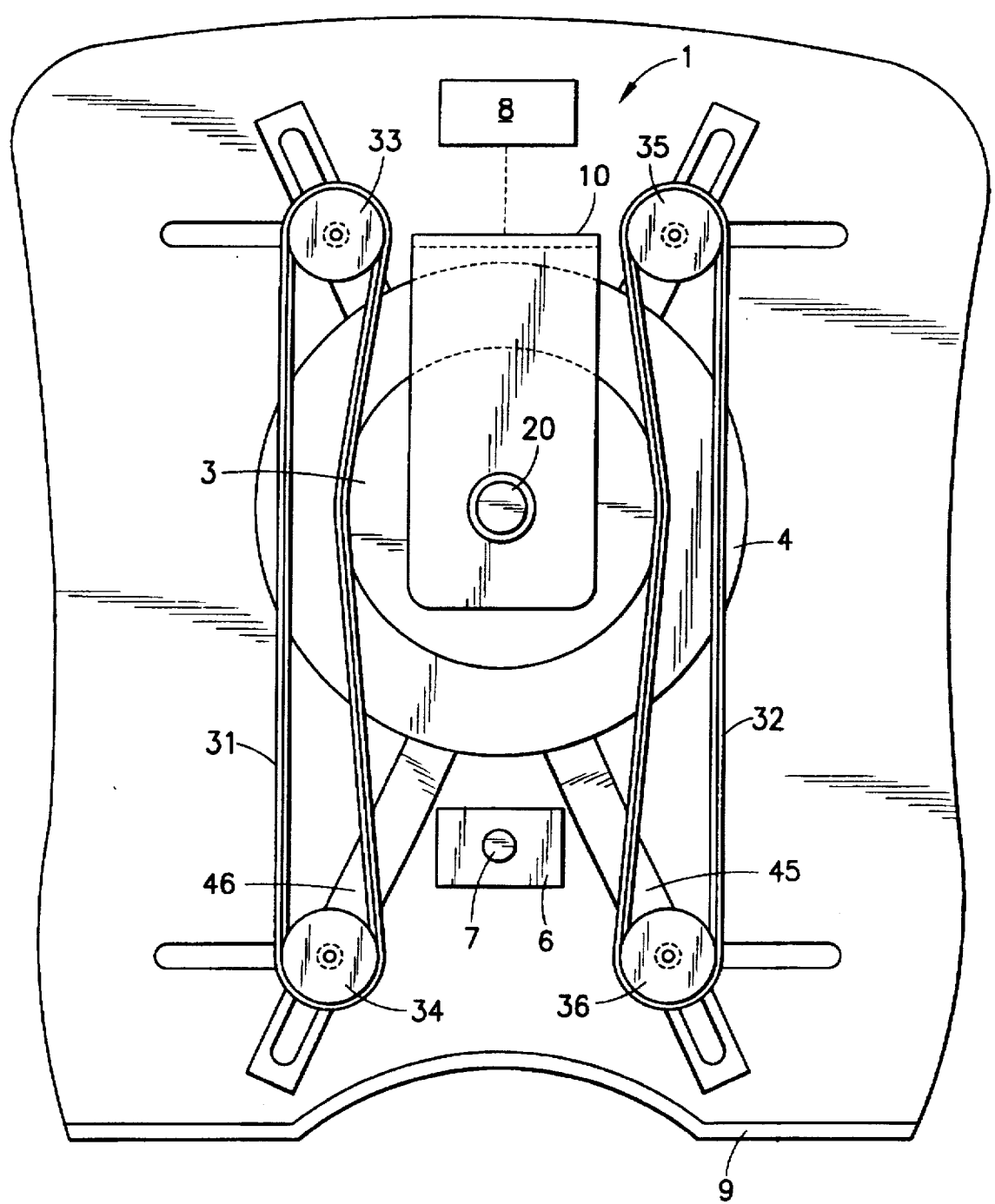
FIG. 14 is a plan view of the disk playback device showing the pair of drive belts holding an 8 cm. disk.

Referring to FIGS. 8 and 14, to play back 8 cm. disk 3 after second 12 cm. disk 5 is stored within stocker 10, microprocessor 70 sends a stocker drive signal from output terminal 75. Stocker 10 is then moved downward by stocker transfer mechanism 8 until 8 cm. disk 3 and drive belts 31 and 32 lie on the same plane. Then, microprocessor 70 sends a control signal from output terminal 77 that drives drive belt transfer mechanism 60 to adjust the distance between endless drive belts 31 and 32 until drive belts 31 and 32 are partially wrapped around 8 cm. disk 3.

Before the 8 cm. disk 3 is transported, microprocessor 70 sends a control signal from output terminal 76 to control shaft transfer mechanism 25. Shaft transfer mechanism 25 moves regulating shaft 27 into upper shaft 21 to open up gap 24 between upper shaft 21 and lower shaft 23.

Figure 15:
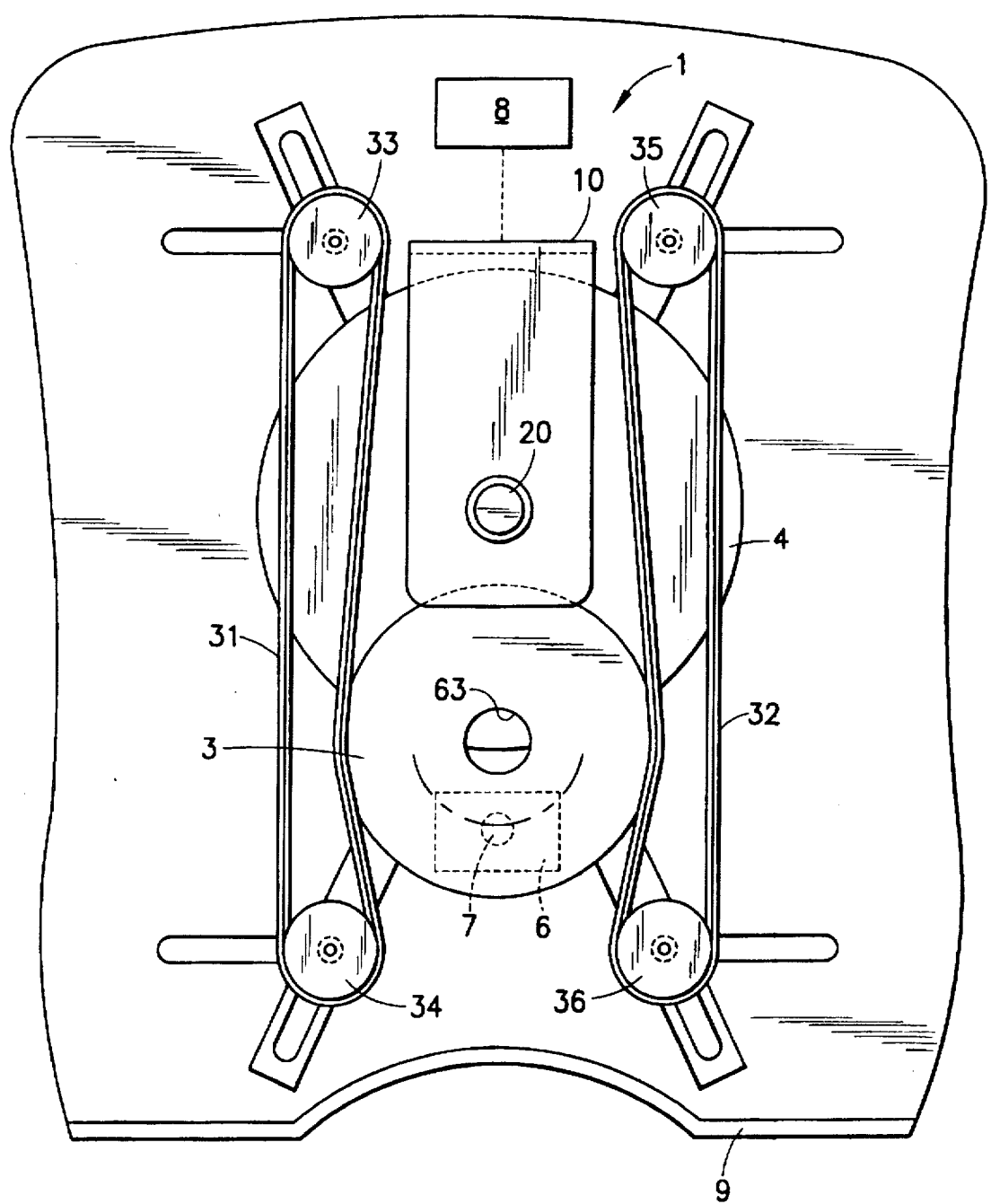
FIG. 15 is a plan view of the disk playback device showing an 8 cm. disk in the initial playback position.

Referring also to FIG. 15, microprocessor 70 then outputs a disk transfer signal, a predetermined negative voltage, at output terminal 73. This causes motor 61 to rotate clockwise and motor 62 to rotate counterclockwise, causing 8 cm. disk 3 to be pulled out from stocker 10 by drive belts 31 and 32. Eight cm. disk 3 is brought to the initial playback position and, as described above, drive belts 31 and 32 rotate 8 cm. disk 3 clockwise at an appropriate speed for playback.

Figure 16:
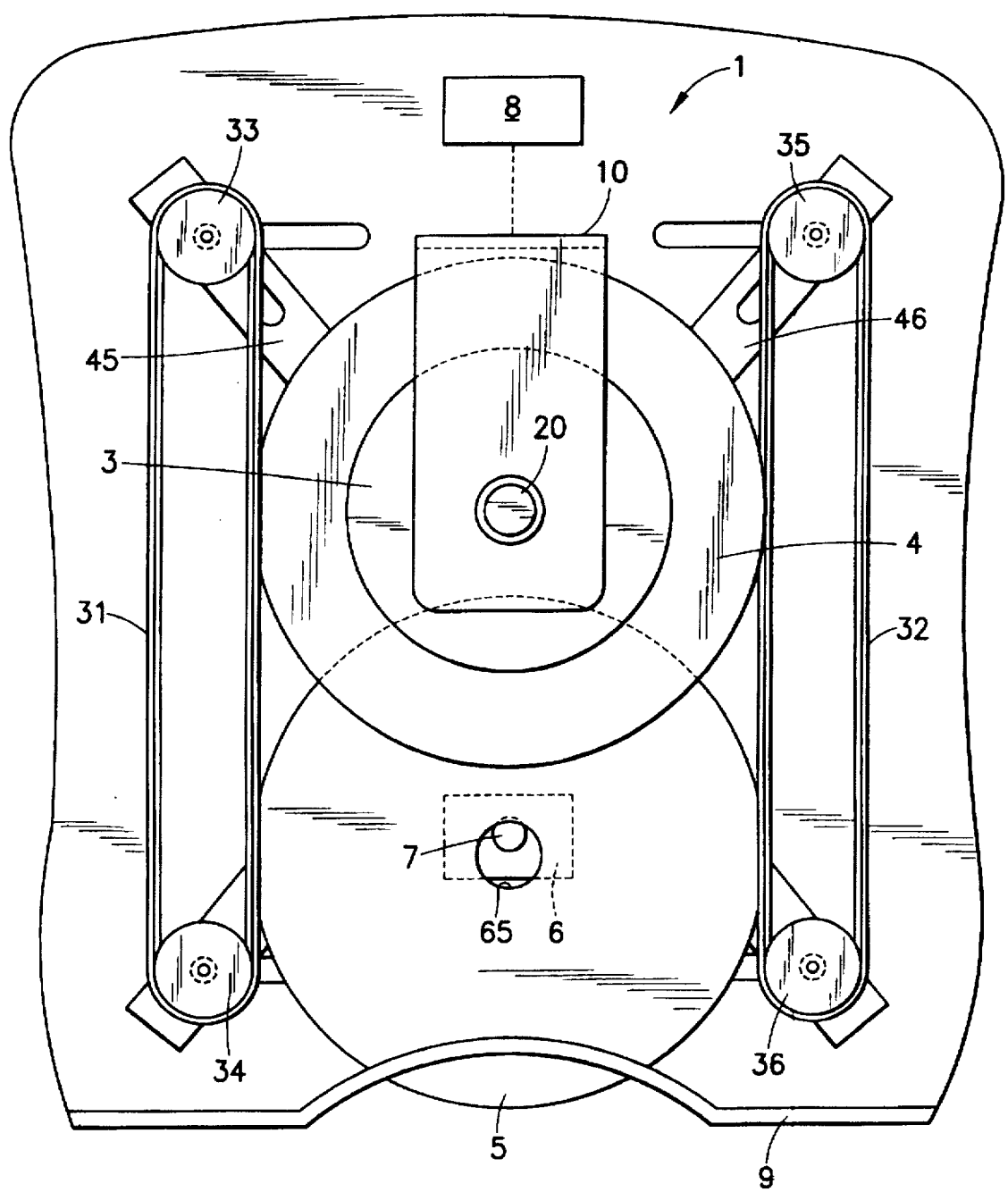
FIG. 16 is a plan view of the disk playback device showing the disk in the eject position.

Referring to FIGS. 11 and 16, during ejection, a negative disk transfer signal is output from output terminal 73 by microprocessor 70. This causes motor 61 to rotate clockwise and motor 62 to rotate counterclockwise. After being transported a certain distance, a portion of second 12 cm. disk 5 projects from the opening in front panel 9. At the final playback position, the distance between the inner sides of drive pulleys 33 and 35 and driven pulleys 34 and 36 is smaller than the diameter of disk 5 so that drive belts 31 and 32 wrap around the rim of second 12 cm. disk 5. Thus, as second 12 cm. disk 5 moves toward the eject position, the distance between driven pulleys 34 and 36, at the eject position, becomes greater than that shown in FIG. 11. Second 12 cm. disk 5 is then transported past driven pulleys 34 and 36, ejecting the disk.

Figure 17:
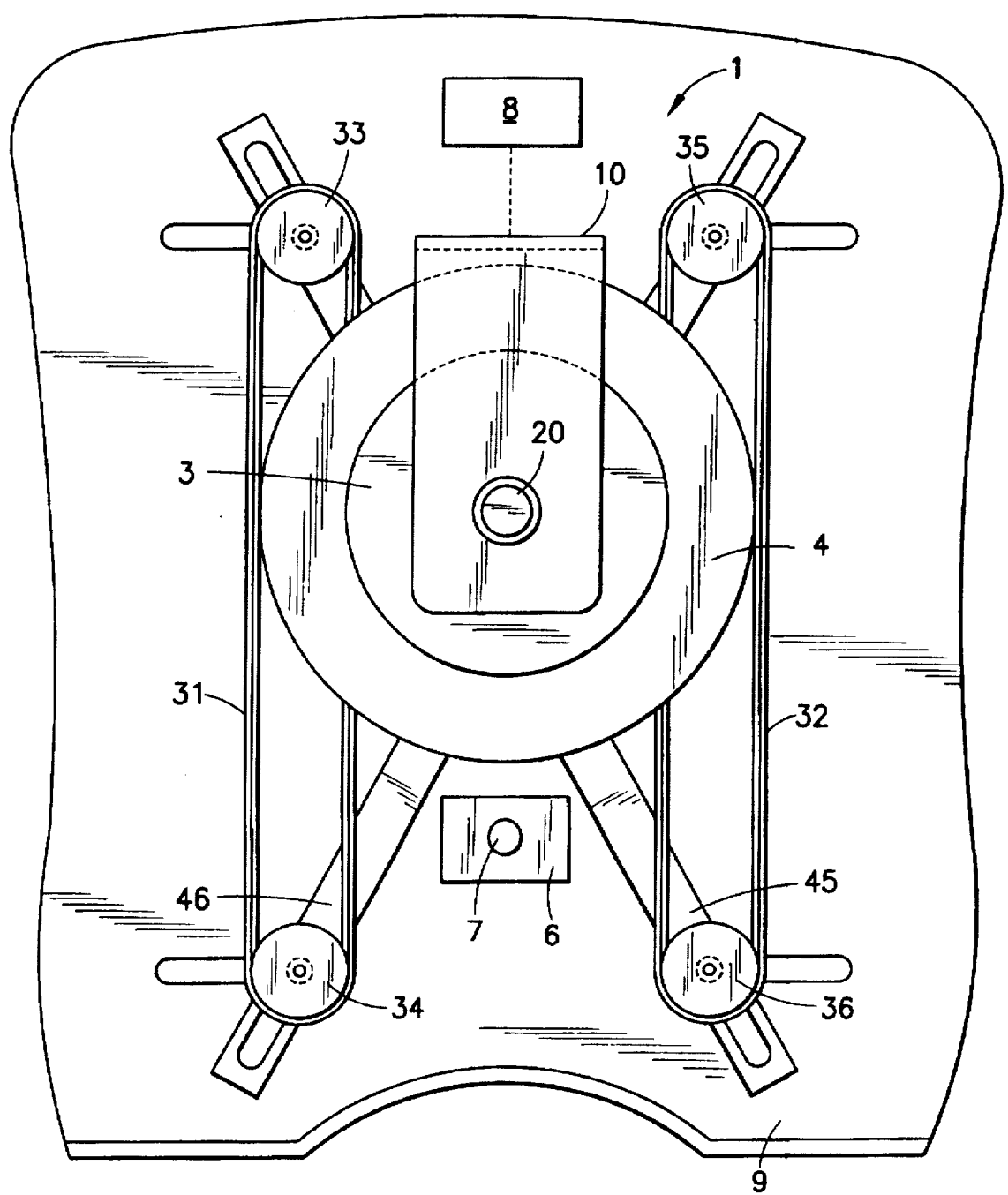
FIG. 17 is a plan view of the device in the loading standby state.

Referring to FIG. 17, when it has been determined that second 12 cm. disk 5 has been removed from disk playback device 1 by the user, microprocessor 70 sends a drive belt transfer control signal through output terminal 77. The drive belt transfer signal causes drive belt transfer mechanism 60 to move drive belts 31 and 32 to the loading standby position shown, allowing loading of 8 cm. or 12 cm. disks. In this position, the distance between the inner sides of driven pulleys 34, 36 is smaller than the diameter of an 8 cm. disk.

When an 8 cm. or 12 cm. disk is inserted from the opening in front panel 9, a force is applied to driven pulleys 34, 36 which pushes them apart, increasing the distance between them. Therefore, sliding plates 47 and 48, connected by rotating arms 45 and 46, move away from each other in the same manner. When this movement is detected, microprocessor 70 outputs a positive disk transfer signal at output terminal 73 to move drive belts 31 and 32 to load the inserted disk into disk playback device 1.

If the loaded disk is to be stored within stocker 10 without being played back, then the following operations are performed. Referring to FIG. 11, when the center of the loaded disk is positioned at the final playback position, microprocessor 70 controls shaft transfer mechanism 25 to move transfer shaft 22 toward lower shaft 23. A tip of regulating shaft 27 presses against the surface of second 12 cm. disk 5. Endless drive belts 31 and 32 are rotated to move second 12 cm. disk 5 toward stocker 10. When center hole 65 of second 12 cm. disk is aligned with regulating shaft 27, regulating shaft 27 inserts into center hole 65 of second 12 cm. disk 5 under the urging of spring 30. Thus second 12 cm. disk 5 is secured in stocker 10.

When moving any disk into stocker 10, the tip of regulating shaft 27 slides against the surface of the disk. To prevent damage to the disk, it is desirable for regulating shaft 27 to be of a material with a low friction coefficient, such as polyacetal resin. It is also possible to attach a member having a low friction coefficient to tip of regulating shaft 27.

According to the embodiment described above, a pair of endless drive belts are used to transport a disk between an eject position, a playback position, and a storage position. The same endless drive belts rotate a disk at an appropriate speed at the playback position resulting in a low-cost disk playback device.

Although in the embodiment described above, endless drive belts 31 and 32 rotate a disk to be read at the playback position and gradually reposition the disk as the disk is being read to maintain the portion of the spiral track being read above the fixed optical pickup, it is clear that the optical pickup could be movable relative to the chassis. Thus, the endless drive belts would rotate the disk at the playback position and the optical pickup would move radially, relative to the disk, to remain under the portion of the spiral track being read. Such other embodiments are considered within the spirit and scope of the invention.

Although in the embodiment described above, the storage capacity is limited to three disks, it is clear that the disk holding capacity of the disk player can be any number of disks. Such other embodiments are considered within the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk playback device for playing back a disk, comprising:

a chassis;

said disk moveable between a first and second position on said chassis;

a pair of endless drive belts, each having an inner surface and an outer surface, rotatably supported by said chassis;

means for positioning said pair of endless drive belts to support said disk therebetween;

a portion of said outer surface of each one of said pair of endless drive belts directly engaging a respective one of two opposing portions of a rim of said disk;

means for rotating said pair of endless drive belts;

first controlling means for rotating said pair of endless drive belts in the same direction, whereby said disk is rotated for reading said disk at a first position;

second controlling means for rotating at least one of said pair of endless drive belts such that said disk is transported between said first and second positions; and means on said chassis for reading said disk while said disk is rotated at said first position by said first controlling means.

2. The disk playback device of claim 1, wherein said each one of said pair of endless drive belts is supported by a respective drive pulley and a respective driven pulley.

3. The disk playback device of claim 2, wherein:

said outer surface of each of said pair of endless drive belts has a concave groove in which said rim of said disk is received when said pair of endless drive belts engage said rim.

4. The disk playback device of claim 2, wherein said means for rotating includes a motor connected to each of said drive pulleys.

5. The disk playback device of claim 4, further comprising playback control means for controlling said first and second controlling means to simultaneously rotate and transport said disk.

6. The disk playback device of claim 1, wherein said means for reading said disk includes a fixed optical pickup for reading information recorded on a spiral track of said disk.

7. The disk playback device of claim 6, wherein said first controlling means includes a constant linear velocity (CLV) servo-mechanism, effective to maintain a constant linear velocity of a portion of said spiral track relative to said optical pickup when said information recorded on said spiral track is being read.

8. The disk playback device of claim 7, further comprising playback control means for controlling said first and second controlling means to simultaneously rotate and transport said disk such that an alignment of said portion of said spiral track with said optical pickup is maintained.

9. The disk playback device of claim 1, further comprising playback control means for controlling said first and second controlling means to simultaneously rotate and transport said disk such that an alignment of a portion of a spiral track on said disk with said means on said chassis for reading, is maintained.

10. The disk playback device of claim 1, wherein:

said each one of said pair of endless drive belts is supported by a respective drive pulley and a respective driven pulley;

spanning portions of each endless drive belt stretch between said respective drive pulley and said respective driven pulley; and said means for positioning said pair of endless drive belts maintains said spanning portions of each pair of endless drive belts parallel to each other.

11. The disk playback device of claim 10, wherein said means for positioning said pair of endless drive belts includes means for adjusting a distance between said pair of endless drive belts effective to permit said pair of endless drive belts to selectively support 12 cm. disks and 8 cm. disks.

12. A disk playback device of claim 1, further comprising:

a stocker for storing said selected disk and at least another disk; and said second controlling means being effective to transport said disk to said stocker.

13. A disk playback device capable of holding a plurality of disks, comprising:

a chassis;

first and second endless drive belts, each having an inner surface and an outer surface;

first and second drive pulleys;

first and second driven pulleys;

said first endless drive belt reeved around said first drive pulley and said first driven pulley;

said first drive pulley and said first driven pulley being rotatably supported on said chassis;

said second endless drive belt reeved around said second drive pulley and said second driven pulley;

said second drive pulley and said second driven pulley being rotatably supported on said chassis;

spanning portions of said first and second endless drive belts stretch between said respective drive pulleys and said respective driven pulleys;

said spanning portions being parallel and in a common horizontal plane;

a stocker for holding said plurality of disks;

means for moving said stocker vertically such that a selected one of said plurality of disks is positioned on said horizontal plane of said first and second endless drive belts;

means for simultaneously moving said first and second endless drive belts toward or away from said selected disk so that an outer peripheral edge of said selected disk is selectively held and released by said first and second endless drive belts;

first means for rotating said first and second endless drive belts such that said disk, directly engaged and held by said first and second drive belts, is transferred between said stocker, a playback position and an eject position;

second means for rotating said first and second endless drive belts such that said disk, directly engaged and held by said first and second drive belts, is rotated in said playback position; and means for playing back said disk while said disk is rotated, by said second means, in said playback position.

14. The disk playback device of claim 13 wherein said stocker further comprises:

a vertical mounting wall at a rear end of said stocker;

a plurality of mounting plates attached to said vertical mounting wall;

each one of said plurality of mounting plates having an upper surface which supports one of said plurality of disks; and shaft means for restricting horizontal movements of said plurality of disks held in said stocker.

15. The disk playback device of claim 14 wherein said shaft means further comprises:

an upper shaft;

a lower shaft;

said upper shaft and said lower shaft axially aligned with a gap between them; and bridging means for selectively opening and closing said gap.

16. The disk playback device of claim 15 wherein said bridging means further comprises:

a spring;

a regulating shaft;

said spring urging said regulating shaft downward against said selected disk when a portion of said selected disk is in said gap and said selected disk is to be stored in said stocker; and said spring inserting said regulating shaft through a center hole of said selected disk when said pair of endless drive belts move said selected disk into concentric alignment with other disks in said stocker.

17. The disk playback device of claim 13 wherein said means for reading said selected disk in said playback position further comprises:

an optical disk reader fixedly mounted in said disk playback device having means for reading a spiral track formed on said selected disk; and means for gradually moving said selected disk with respect to said optical disk reader as said selected disk is being read so that said spiral track remains in a predetermined position relative to said disk reader.

18. The disk playback device of claim 17 wherein said means for gradually moving said selected disk includes means for adjusting a speed of one of said first and second endless drive belts effective to gradually move a center of rotation of said selected disk away from said optical disk reader.

* * * * *